US012783448B2

(12) United States Patent
Wang et al.

(10) Patent No.: US 12,783,448 B2
(45) Date of Patent: Nov. 3, 2026

(54) DEVICE FOR MONITORING INTER-INTEGRATED CIRCUIT BUS

(71) Applicant: Alpha Networks Inc., Hsinchu (TW)

(72) Inventors: Chien-Hua Wang, Hsinchu (TW); Pao-Kang Mo, Hsinchu (TW); Shih-Feng Tseng, Hsinchu (TW)

(73) Assignee: Alpha Networks Inc., Hsinchu (TW)

( * ) Notice: Subject to any disclaimer, the term of this patent is extended or adjusted under 35 U.S.C. 154(b) by 44 days.

(21) Appl. No.: 18/537,242

(22) Filed: Dec. 12, 2023

(65) Prior Publication Data

US 2025/0004978 A1 Jan. 2, 2025

(30) Foreign Application Priority Data

Jun. 28, 2023 (TW) ................................ 112124083

(51) Int. Cl.
*G06F 13/42* (2006.01)

(52) U.S. Cl.
CPC .. *G06F 13/4282* (2013.01); *G06F 2213/0016* (2013.01)

(58) Field of Classification Search
None
See application file for complete search history.

(56) References Cited

U.S. PATENT DOCUMENTS

| | | | | |
|---|---|---|---|---|
| 6,081,783 | A * | 6/2000 | Divine | H03M 7/30 704/201 |
| 7,187,307 | B1 * | 3/2007 | Schmidt | H04L 25/4908 341/51 |
| 2004/0189812 | A1 * | 9/2004 | Gustavsson | H04N 17/002 348/207.99 |
| 2006/0170658 | A1 * | 8/2006 | Nakamura | G06F 3/0412 345/173 |
| 2014/0149615 | A1 * | 5/2014 | Fosse | G06F 13/364 710/110 |
| 2014/0192583 | A1 * | 7/2014 | Rajan | G11C 7/10 365/63 |
| 2018/0181531 | A1 * | 6/2018 | Foust | G06F 13/36 |
| 2020/0004708 | A1 * | 1/2020 | Zhou | G06F 13/362 |
| 2022/0014963 | A1 * | 1/2022 | Yeh | H04W 28/0268 |
| 2022/0069913 | A1 * | 3/2022 | Tanaka | G06F 9/4403 |
| 2022/0091952 | A1 * | 3/2022 | Pitigoi-Aron | G06F 11/0772 |

(Continued)

*Primary Examiner* — Henry Tsai
*Assistant Examiner* — Christopher A Bartels
(74) *Attorney, Agent, or Firm* — Blank Rome LLP

(57) ABSTRACT

A device includes a signal-edge detector, an anomaly detector and a reset-interrupt generator. The signal-edge detector outputs a timing-start signal when detecting that a logic level of an SDA signal from an SDA line of an $I^2C$ bus changes from logical high to logical low, and outputs a timing-reset signal when detecting that the logic level changes from logical low to logical high. Upon receiving the timing-start signal, the anomaly detector starts to time a timing duration, and outputs an error signal when the timing duration reaches a preset time duration. Upon receiving the timing-reset signal, the anomaly detector resets the timing duration to zero. In response to receipt of the error signal, the reset-interrupt generator outputs an interrupt signal to a processor for removing an abnormal state, or outputs a pin-reset signal to an optical module to reset a pin connected to the SDA line.

3 Claims, 2 Drawing Sheets

(56) References Cited

U.S. PATENT DOCUMENTS

| | | | | |
|---|---|---|---|---|
| 2023/0176873 | A1* | 6/2023 | Wu | G06F 1/00<br>713/1 |
| 2023/0182484 | A1* | 6/2023 | Djayaputra | B65H 20/02<br>347/171 |
| 2024/0111619 | A1* | 4/2024 | Tao | G06F 11/0745 |
| 2025/0068503 | A1* | 2/2025 | Song | G06F 11/0772 |
| 2025/0219880 | A1* | 7/2025 | Shao | H04B 14/026 |
| 2026/0081635 | A1* | 3/2026 | Bullock | H04B 1/38 |
| 2026/0113346 | A1* | 4/2026 | Seelam | H04L 63/1425 |

* cited by examiner

DEVICE FOR MONITORING INTER-INTEGRATED CIRCUIT BUS

CROSS-REFERENCE TO RELATED APPLICATION

This application claims priority to Taiwanese Invention Patent Application No. 112124083, filed on Jun. 28, 2023.

FIELD

The disclosure relates to a device for monitoring an inter-integrated circuit ($I^2C$) bus, and more particularly to a device for monitoring an $I^2C$ bus that is electrically connected between a processor and an optical module.

BACKGROUND

Optical modules (e.g., an optical transceiver) have been widely used in telecommunication systems. However, the optical module often malfunctions (e.g., a logic level of a signal on a serial data (SDA) line is unable to change from logical low to logical high) due to hot swapping.

Conventionally, for troubleshooting, software supporting the inter-integrated circuit (I2C) protocol is executed to access the optical module, and to reset the optical module when it is determined that the optical module is inaccessible. However, such an approach may adversely impact operation of the telecommunication system.

SUMMARY

Therefore, an object of the disclosure is to provide a device for monitoring an inter-integrated circuit ($I^2C$) bus that can alleviate at least one of the drawbacks of the prior art.

According to the disclosure, the $I^2C$ bus is electrically connected between a processor and an optical module, and includes a serial data (SDA) line. The device includes a signal-edge detector, an anomaly detector and a reset-interrupt generator.

The signal-edge detector is electrically connected to the SDA line of the $I^2C$ bus, and is configured to continuously detect an SDA signal from the SDA line of the $I^2C$ bus, to generate and output a timing-start signal when detecting that a logic level of the SDA signal changes from logical high to logical low, and to generate and output a timing-reset signal when detecting that the logic level of the SDA signal changes from logical low to logical high.

The anomaly detector is electrically connected to the signal-edge detector. The anomaly detector is configured to, upon receiving the timing-start signal from the signal-edge detector, start to time a timing duration, and determine whether the timing duration reaches a preset time duration. The anomaly detector is configured to generate and output an error signal when it is determined that the timing duration reaches the preset time duration, and upon receiving the timing-reset signal from the signal-edge detector, to reset the timing duration to zero.

The reset-interrupt generator is electrically connected to the anomaly detector, and is adapted to be electrically connected to the processor and the optical module. The reset-interrupt generator is configured to in response to receipt of the error signal from the anomaly detector, perform one of a step of outputting an interrupt signal to the processor to allow the processor to remove an abnormal state, and a step of outputting a pin-reset signal to the optical module to allow the optical module to reset a pin that is electrically connected to the SDA line of the $I^2C$ bus.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
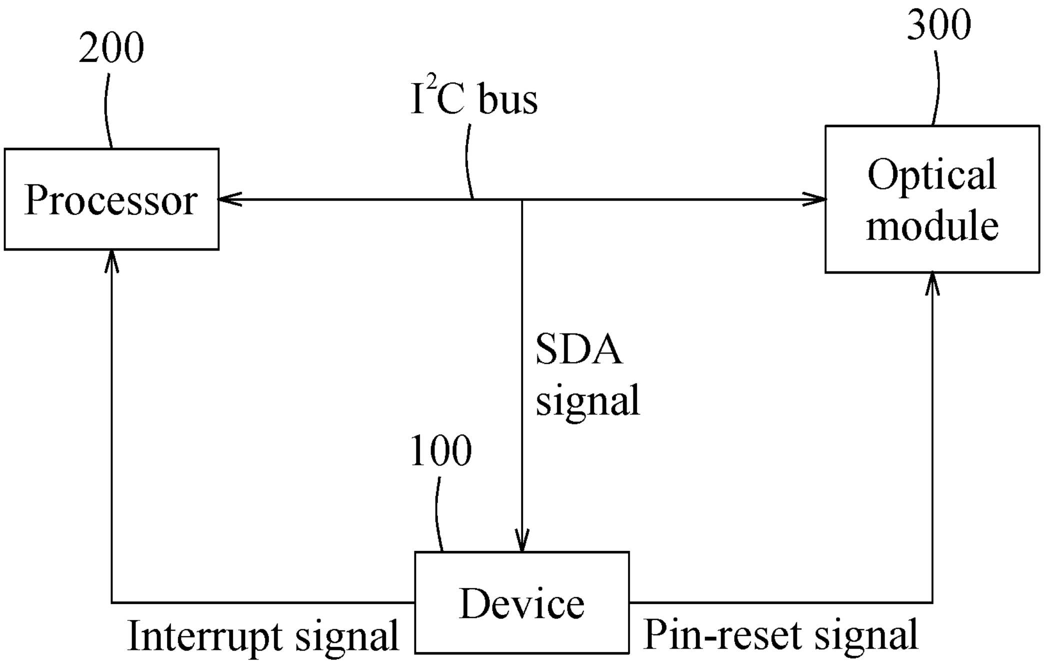
FIG. 1 is a block diagram illustrating a device used for monitoring an inter-integrated circuit ($I^2C$) bus according to an embodiment of the disclosure.
Figure 2:
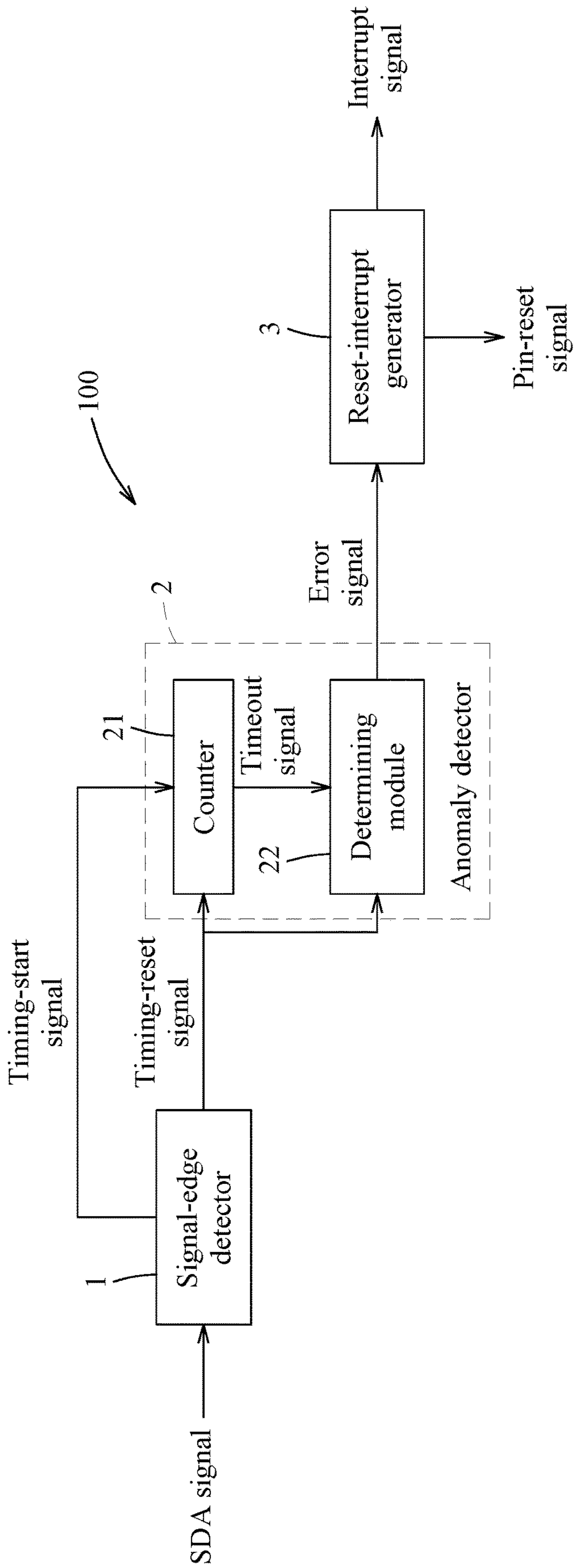
FIG. 2 is a block diagram of the device for monitoring an $I^2C$ bus according to an embodiment of the disclosure.

Referring to FIGS. 1 and 2, an embodiment of a device 100 for monitoring an inter-integrated circuit ($I^2C$) bus according to the disclosure is illustrated. The $I^2C$ bus is electrically connected between a processor 200 and an optical module 300. The $I^2C$ bus is a serial communication bus, and includes a serial data (SDA) line (not shown) for data transmission and a serial clock (SCL) line (not shown) for clock signal transmission. The device 100 is adapted to be electrically connected to the SDA line for monitoring the $I^2C$ bus.

A brief introduction to a conventional $I^2C$ protocol is provided in the following. A logic level of an SDA signal on the SDA line and a logic level of an SCL signal on the SCL line should be both maintained at logical high when no data is transmitted via the $I^2C$ bus. During utilizing the SDA line for data transmission (including data reading and data writing), no matter which kind of $I^2C$ format is used, the data transmission begins with a predefined start condition (where each of the SDA signal and the SCL signal is at a specific logic level) followed by data that is to be transmitted, and ends with a predefined stop condition (where the logic level of the SDA signal returns to logical high). That is to say, a condition that the logic level the SDA signal is always kept at logical low without returning to logical high during data transmission by the $I^2C$ bus will be regarded as abnormal.

The processor 200 may be a central processing unit (CPU), a microprocessor, a micro control unit (MCU), a system on a chip (SoC), or any circuit configurable/programmable in a software manner and/or hardware manner to implement functionalities discussed in this disclosure.

The optical module 300 may be an optical transceiver, but is not limited thereto.

As shown in FIG. 2, the device 100 for monitoring the $I^2C$ bus includes a signal-edge detector 1, an anomaly detector 2 and a reset-interrupt generator 3. It is worth to note that the device 100 may be implemented by a complex programmable logic device (CPLD) developed under hardware-software co-design, and each of the signal-edge detector 1, the anomaly detector 2 and the reset-interrupt generator 3 may be one of or a combination of hardware, firmware and software.

The signal-edge detector 1 is electrically connected to the SDA line of the $I^2C$ bus. The signal-edge detector 1 is configured to continuously detect the SDA signal from the SDA line of the $I^2C$ bus, generate and output a timing-start signal when detecting that the logic level of the SDA signal changes from logical high to logical low, and generate and output a timing-reset signal when detecting that the logic level of the SDA signal changes from logical low to logical high.

The anomaly detector 2 is electrically connected to the signal-edge detector 1 and the reset-interrupt generator 3. Upon receiving the timing-start signal from the signal-edge detector 1, the anomaly detector 2 is configured to start to time a timing duration, and to determine whether the timing duration reaches a preset time duration. The anomaly detector 2 is further configured to generate and output an error signal to the reset-interrupt generator 3 when it is determined that the timing duration reaches the preset time duration. On the other hand, upon receiving the timing-reset signal from the signal-edge detector 1, the anomaly detector 2 is configured to reset the timing duration to zero.

Specifically, the anomaly detector 2 includes a counter 21 and a determining module 22.

The counter 21 is electrically connected to the signal-edge detector 1. Upon receiving the timing-start signal from the signal-edge detector 1, the counter 21 is configured to count a counted value starting from zero based on a reference clock signal (which is generated by the device 100, i.e., the CPLD, based on an external clock source), and generate and output a timeout signal every time overflow occurs in the counter 21 during counting. In addition, upon receiving the timing-reset signal from the signal-edge detector 1, the counter 21 is configured to reset the counted value to zero.

The determining module 22 is electrically connected to the signal-edge detector 1, the counter 21 and the reset-interrupt generator 3. The determining module 22 is configured to receive the timeout signal from the counter 21, to count a number of accumulative times of receiving the timeout signal from the counter 21, and to determine whether the timing duration reaches the preset time duration by determining whether the number of accumulative times of receiving the timeout signal from the counter 21 has reached a preset number. The determining module 22 is configured to generate and output the error signal to the reset-interrupt generator 3 when it is determined that the number of accumulative times of receiving the timeout signal from the counter 21 has reached the preset number. Upon receiving the timing-reset signal from the signal-edge detector 1, the determining module 22 is configured to reset the number of accumulative times of receiving the timeout signal to zero. It is worth to note that the anomaly detector 2 resets the timing duration to zero by resetting the number of accumulative times of receiving the timeout signal to zero and resetting the counted value to zero.

It is worth to note that the preset time duration is related to the preset number, a period of the reference clock signal and a maximum setting of the counter 21. In particular, the preset time duration is a product of the preset number, the period of the reference clock signal and the maximum setting of the counter 21.

In a scenario where the preset number is 9, the maximum setting of the counter 21 (which is a 8-bit counter) is 256 and the period of the reference clock signal is 1 ms, the preset time duration will be equal to 2304 ms, i.e., $1\times256\times9=2304$.

In general, when the SDA line of the $I^2C$ bus is being used to transmit data (including data reading and data writing), the logic level of the SDA signal frequently changes between logical high and logical low during data transmission. Therefore, the counter 21 starts to count the counted value upon receiving the timing-start signal (the logic level changing from logical high to logical low), and usually before overflow occurs, and then resets the counted value to zero upon receiving the timing-reset signal (the logic level changing from logical low to logical high), without generating and outputting the timeout signal. In this embodiment, a condition that the logic level of the SDA signal has been kept at logical low for 2304 ms without returning to logical high during data transmission by the $I^2C$ bus is regarded as abnormal, and thus the error signal is generated and outputted to the reset-interrupt generator 3, accordingly.

The reset-interrupt generator 3 is adapted to be electrically connected to the processor 200 and the optical module 300. The reset-interrupt generator 3 is configured to in response to receipt of the error signal from the determining module 22 of the anomaly detector 2, perform one of a step of outputting an interrupt signal to the processor 200 to allow the processor 200 to remove an abnormal state, and a step of outputting a pin-reset signal to the optical module 300 to allow the optical module 300 to reset a pin that is electrically connected to the SDA line of the $I^2C$ bus. For example, in response to receipt of the interrupt signal from the reset-interrupt generator 3, the processor 200 would execute relevant software programs for removing the abnormal state. More specifically, in order to remove the abnormal state, the processor 200 would perform a procedure according to settings of an operating system run by the processor 200 to reset the optical module 300, to output a message for notifying a user to check the optical module 300, or to enable the device 100 (i.e., the CPLD) to reset the optical module 300. In response to receipt of the pin-reset signal from the reset-interrupt generator 3, the optical module 300 would be reset to revert the current settings thereof to default settings. In addition, a pull-up resistor would be electrically connected to the SDA line of the $I^2C$ bus to raise the logical level of the SDA signal to logical high.

To sum up, the device 100 according to the disclosure monitors the $I^2C$ bus connected between the processor 200 and the optical module 300 in real time, and determines whether an error occurs on the $I^2C$ bus by determining whether the SDA signal of the SDA line of the $I^2C$ bus has been at the low logical level for the preset time duration. When it is determined that an error occurs on the $I^2C$ bus, the device 100 outputs the interrupt signal to the processor 200 or outputs the pin-reset signal to the optical module 300 so as to remove the abnormal state in time. In this way, the I2C bus may be monitored without disturbing normal operations of the processor 200 and the optical module 300.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A device for monitoring an inter-integrated circuit ($I^2C$) bus that is electrically connected between a processor and an optical module, the $I^2C$ bus including a serial data (SDA) line, said device comprising:

a signal-edge detector electrically connected to the SDA line of the $I^2C$ bus, and configured to continuously detect an SDA signal from the SDA line of the $I^2C$ bus, generate and output a timing-start signal when detecting that a logic level of the SDA signal changes from logical high to logical low, and generate and output a timing-reset signal when detecting that the logic level of the SDA signal changes from logical low to logical high;

an anomaly detector electrically connected to said signal-edge detector, and configured to:

upon receiving the timing-start signal from said signal-edge detector, start to time a timing duration, and determine whether the timing duration reaches a preset time duration, generate and output an error signal when it is determined that the timing duration reaches the preset time duration, and upon receiving the timing-reset signal from said signal-edge detector, reset the timing duration to zero; and a reset-interrupt generator electrically connected to said anomaly detector, adapted to be electrically connected to the processor and the optical module, and configured to in response to receipt of the error signal from said anomaly detector, perform one of a step of outputting an interrupt signal to the processor to allow the processor to remove an abnormal state, and a step of outputting a pin-reset signal to the optical module to allow the optical module to reset a pin that is electrically connected to the SDA line of the $I^2C$ bus, wherein said anomaly detector includes a counter that is electrically connected to said signal-edge detector, and that is configured to:

upon receiving the timing-start signal from said signal-edge detector, count a counted value from zero based on a reference clock signal, and generate and output a timeout signal every time overflow occurs in said counter during counting, and upon receiving the timing-reset signal from said signal-edge detector, reset the counted value; and a determining module that is electrically connected to said signal-edge detector, said counter and said reset-interrupt generator, and that is configured to:

receive the timeout signal from said counter, count a number of accumulative times of receiving the timeout signal from said counter, determine whether the timing duration reaches the preset time duration by determining whether the number of accumulative times of receiving the timeout signal from said counter has reached a preset number, generate and output the error signal to said reset-interrupt generator when it is determined that the number of accumulative times of receiving the timeout signal from said counter has reached the preset number, and upon receiving the timing-reset signal from said signal-edge detector, reset the number of accumulative times of receiving the timeout signal to zero.

2. The device as claimed in claim 1, wherein the preset time duration is related to a period of the reference clock signal, a maximum setting of said counter and the preset number.

3. The device as claimed in claim 2, wherein the preset time duration is a product of the period of the reference clock signal, the maximum setting of said counter and the preset number.

* * * * *